United States Patent
Saxena et al.

(10) Patent No.: US 7,423,737 B2
(45) Date of Patent: Sep. 9, 2008

(54) VELOCITY DETERMINATION UTILIZING TWO PHOTOSENSOR ARRAYS

(75) Inventors: Kuldeep Kumar Saxena, Singapore (SG); Srinivasan Lakshmanan, Penang (MY); Wai Keat Tai, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/668,074

(22) Filed: Jan. 29, 2007

(65) Prior Publication Data

US 2008/0180651 A1    Jul. 31, 2008

(51) Int. Cl.
G01P 3/36 (2006.01)
(52) U.S. Cl. .................................................. 356/28
(58) Field of Classification Search .................. 356/28
See application file for complete search history.

(56) References Cited

U.S. PATENT DOCUMENTS 5,291,131 A    3/1994   Suzuki et al.
6,118,132 A *  9/2000   Tullis .................... 250/559.39

* cited by examiner

Primary Examiner—Thomas H. Tarcza
Assistant Examiner—Luke D Ratcliffe (57) ABSTRACT

A technique for relative velocity determination between a surface and a velocity determination system involves capturing a set of outputs from a first photosensor array and then comparing subsequently captured sets of outputs from a second photosensor array to the set of outputs from the first photosensor array until a satisfactory match is found between the outputs. Once a satisfactory match is found, the elapsed time between the capture of the two sets of outputs represents the time to travel the known separation distance between the two photosensor arrays. Given the known distance of travel and the elapsed time to travel the distance, the relative velocity is a simple calculation of the distance traveled divided by the time to travel the distance.

20 Claims, 7 Drawing Sheets

At a first time, capture a set of outputs from a first photosensor array of the velocity detection system, wherein the first photosensor array comprises an array of pixels, with each pixel generating a pixel-specific output in response to light reflected from the surface, the pixel-specific outputs being representation of the intensity of the reflected light ⟵ 400

↓ 402

At a second time that is later than first time, capture a set of outputs from a second photosensor array of the velocity detection system, wherein the second photosensor array comprises an array of pixels, with each pixel generating a pixel-specific output in response to light reflected from the surface, the pixel-specific outputs being representative of the intensity of the reflected light, wherein the the first and second photosensor arrays are separated by a known separation distance

↓

Determine the difference between the set of outputs from the first photosensor array and the set of outputs from the second photosensor array ⟵ 404

↓ 406

Compare the difference between the set of outputs from the first photosensor array and the set of outputs from the second photosensor array to a pre-established difference threshold

↓

Identify the elapsed time between the capture of the set of outputs from the first photosensor array and the capture of the set of outputs from the second photosensor array when the comparison of the difference between the sets indicates that the difference is within the pre-established difference threshold ⟵ 408

↓ 410

Calculate the relative velocity between the surface and the velocity detection system using the elapsed time and the known separation distance

FIG.9

VELOCITY DETERMINATION UTILIZING TWO PHOTOSENSOR ARRAYS

BACKGROUND OF THE INVENTION

In various circumstances it is desirable to know the relative velocity between a surface and an object. It is especially desirable in some applications to be able to determine the relative velocity between a surface and an object without physical contact between the surface and the object.

A prior art technique for determining the relative velocity between a surface and a velocity determination system involves capturing frames of digital image information with an image sensor and then performing a cross-correlation to identify the relative movement of an image feature that is captured in both image frames. The relative movement of an image feature can then be used in combination with the elapsed time between frame capture to determine relative velocity. Although this technique works well, the capturing of frames of digital image information and the cross-correlation of image features are both resource intensive operations.

SUMMARY OF THE INVENTION

A technique for relative velocity determination between a surface and a velocity determination system involves capturing a set of outputs from a first photosensor array and then comparing subsequently captured sets of outputs from a second photosensor array to the set of outputs from the first photosensor array until a satisfactory match is found between the outputs. Once a satisfactory match is found, the elapsed time between the capture of the two sets of outputs represents the time to travel the known separation distance between the two photosensor arrays. Given the known distance of travel and the elapsed time to travel the distance, the relative velocity is a simple calculation of the distance traveled divided by the time to travel the distance.

In an embodiment, determining whether two sets of outputs match each other involves determining the difference between corresponding pixels on a pixel-by-pixel basis. The difference is then compared to a difference threshold and a satisfactory match is assumed to exist when the difference is less than the difference threshold.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 9 depicts a process flow diagram of a method for determining the relative velocity between a surface and a velocity determination system.

Throughout the description similar reference numbers may be used to identify similar elements.

DETAILED DESCRIPTION

Figure 1:
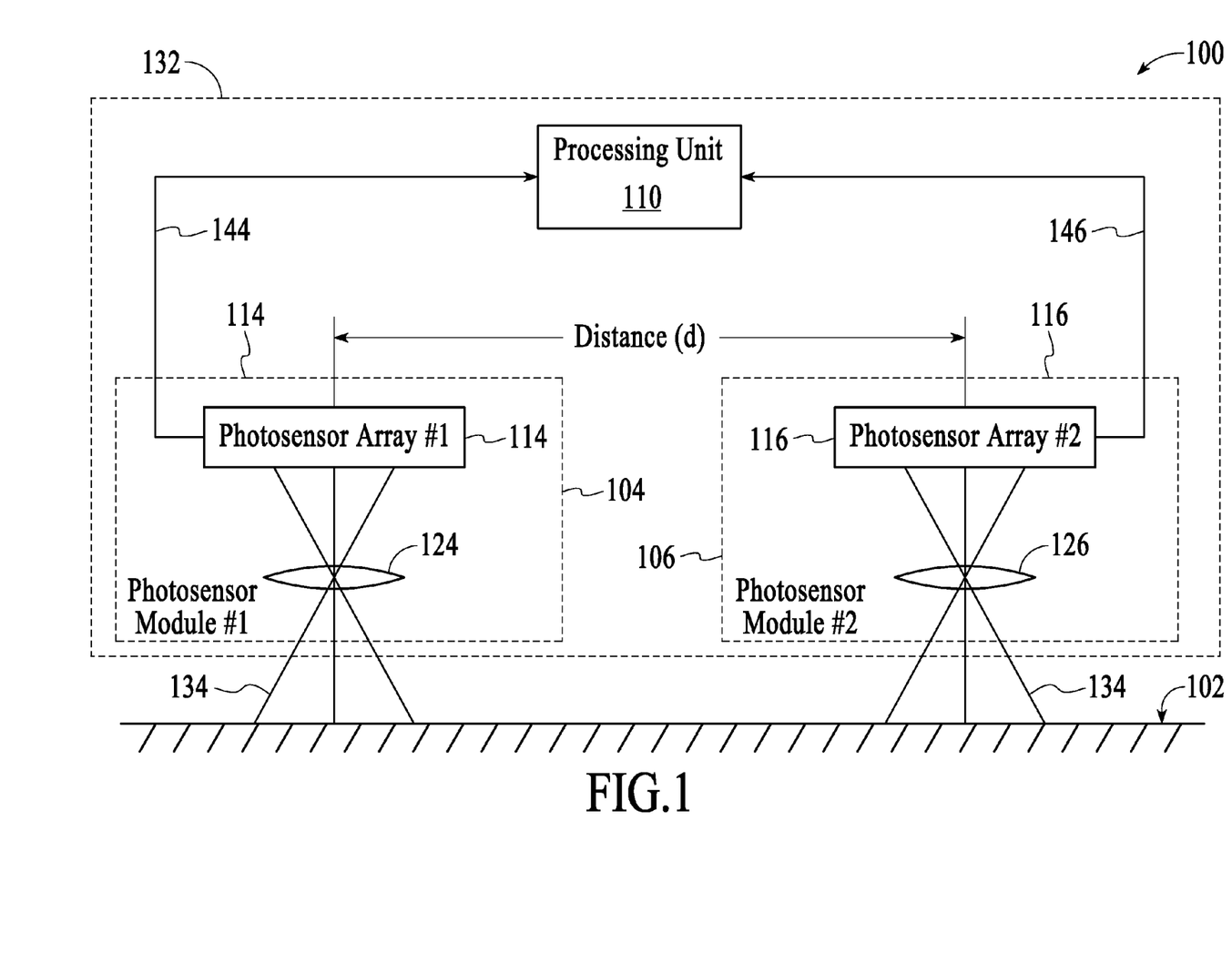
FIG. 1 depicts an embodiment of a velocity determination system.

FIG. 1 depicts an embodiment of a velocity determination system 100 that is positioned relative to a surface 102. Relative movement between the surface and the velocity determination system may be caused by movement of the surface, movement of the velocity determination system, or movement of both the surface and the velocity determination system. The velocity determination system includes two photosensor modules 104 and 106 (identified as photosensor modules #1 and #2) and a processing unit 110. Each photosensor module includes a photosensor array 114, 116 (identified as photosensor arrays #1 and #2) and optics 124, 126. Each photosensor array includes an array of photosensitive pixels, referred to herein simply as "pixels." Each pixel generates a pixel-specific output in response to detected light and each pixel-specific output is representative of the intensity of light that is detected by the respective pixel. In an embodiment, the pixel-specific outputs are provided as analog voltage or current signals that are representative of the intensity of the detected light. In another embodiment, the photosensor outputs are converted to digital values and provided to the processor as digital values that are representative of the intensity of the detected light. For example, analog voltage or current signals are converted to 7-bit digital values that are representative of the intensity of the detected light.

Figure 2:
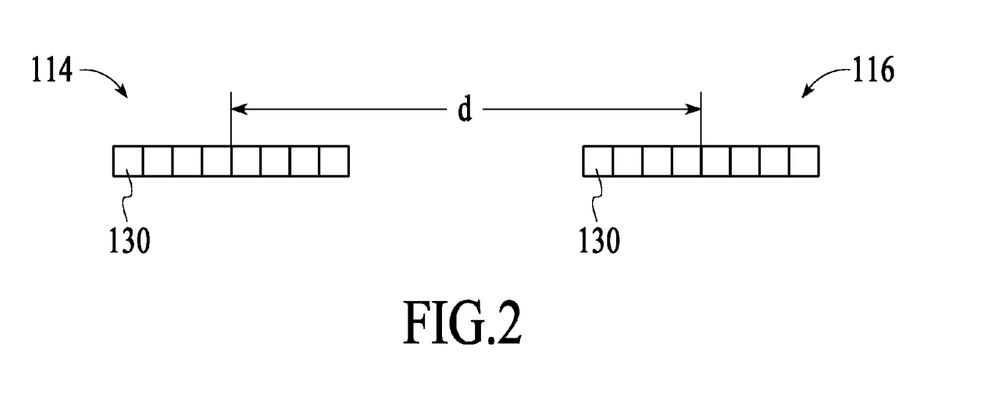
FIG. 2 depicts an example of two one-dimensional photosensor arrays with eight pixels each.
Figure 3:
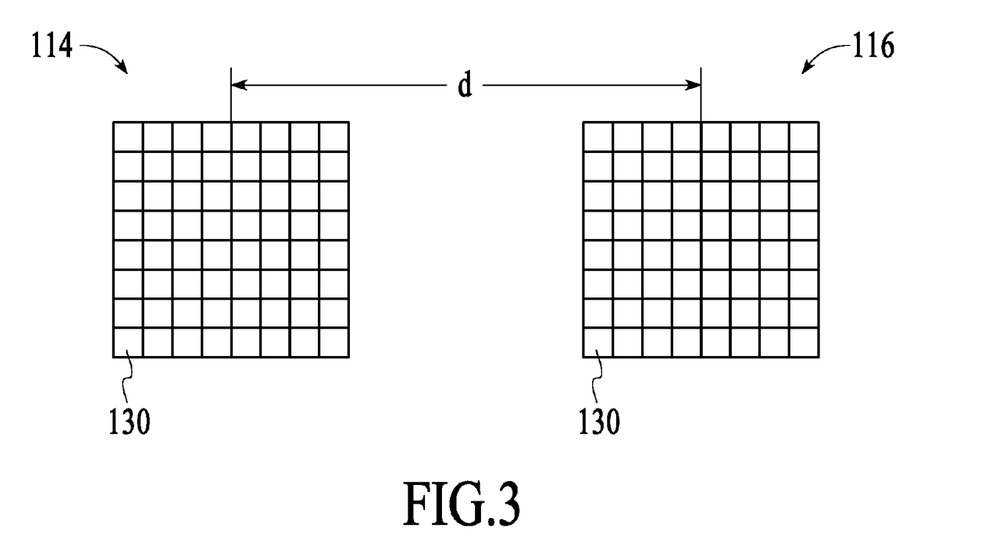
FIG. 3 depicts an example of two two-dimensional photosensor arrays of sixty-four pixels each arranged in 8×8 matrices.

In an embodiment, the photosensor arrays 114, 116 are one-dimensional arrays of pixels. FIG. 2 depicts an example of two one-dimensional photosensor arrays 114, 116 with eight pixels 130 each. In another embodiment, the photosensor arrays are two-dimensional arrays of pixels. FIG. 3 depicts an example of two two-dimensional photosensor arrays 114, 116 of sixty-four pixels each arranged in 8×8 matrices. Exemplary dimensions of photosensor arrays include a 30×30 matrix of 50 um×50 um pixels and a 20×20 matrix of 10 um×10 um pixels. In the embodiment of FIGS. 1-3, the two photosensor arrays of the velocity determination system are identical. In particular, both photosensor arrays have the same number of pixels in the same arrangement such that each pixel of one photosensor array has a corresponding pixel in the other photosensor array.

As indicated in FIGS. 1-3, the two photosensor arrays 114, 116 are separated by a known separation distance, d. In an embodiment, the separation distance is fixed within the velocity determination system 100. The separation distance may be adjustable to different known distances and the particular separation distance is implementation-specific.

In an embodiment, the two photosensor modules 104, 106 and the processing unit 110 of the velocity determination system 100 are enclosed within a housing 132. Structures within the housing set the separation distance, d, between the photosensor arrays 114, 116 and also set the position of the photosensor modules within the housing. Additionally, the housing or some other structure (not shown) sets the position of the housing relative to the surface 102 such that light 134 reflected from the surface is detected by the photosensor arrays. Further, the photosensor arrays are positioned relative to the surface such that both photosensor arrays eventually detect reflected light from the same location on the surface, although at different times.

The optics 124, 126 focus light, which is reflected off the surface 102, onto the respective photosensor array 114, 116. In an embodiment, the optics of each photosensor module 104, 106 include a lens with a 1:1 multiplying effect. In other embodiments, the optics may be selected and configured to expand or reduce the area of the surface that is covered by each photosensor array.

The processing unit 110 is connected to receive the outputs from both of the photosensor arrays 114, 116. For example, the processing unit is connected by parallel connections 144, 146 to each pixel of the respective photosensor arrays. Additionally, the processing unit could be connected to the photosensor arrays by serial connections. The processing unit is configured to determine the relative velocity between the surface and the velocity determination system in response to the outputs that are received from the photosensor arrays. The technique implemented by the processing unit to determine the relative velocity is described in detail below. In an embodiment, the processing unit is an application-specific processor that is designed to determine relative velocity as described below. In other embodiments, the processing unit may be, for example, a multifunction microprocessor.

The basic operation of the velocity determination system 100 involves capturing a set of outputs from a first photosensor array 114 (e.g., photosensor array #1) and then comparing subsequently captured sets of outputs from a second photosensor array 116 (e.g., photosensor array #2) to the set of outputs from the first photosensor array until a satisfactory match is found between the outputs. A satisfactory match between the outputs is a strong indication that the same location on the surface 102 has been passed by both the first and second photosensor arrays. Once a satisfactory match is found, the elapsed time between the capture of the two sets of outputs represents the time to travel the known separation distance between the two photosensor arrays. Given the known distance of travel and the elapsed time to travel the distance, the relative velocity is a simple calculation of the distance traveled divided by the time to travel the distance.

Figure 4:
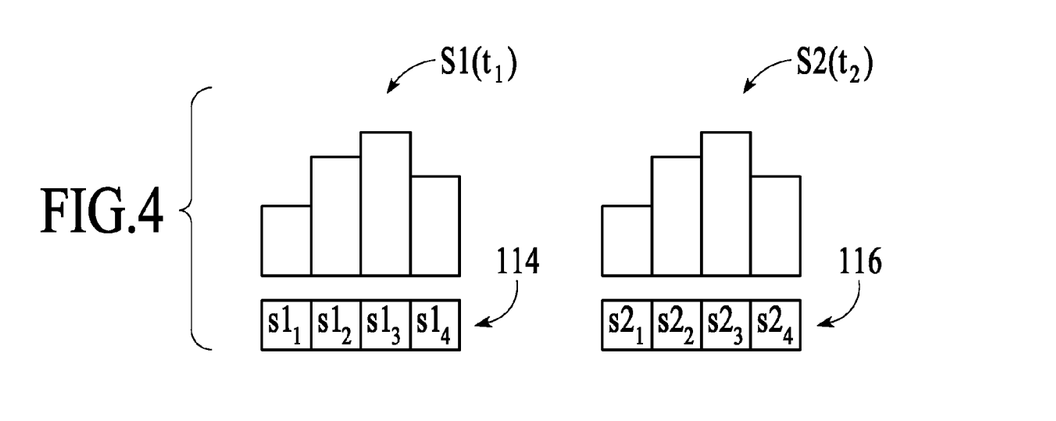
FIG. 4 illustrates two exemplary sets of pixel-specific outputs that are generated from the two photosensor arrays of FIG. 1 in the case where each photosensor array includes four pixels.
Figure 5:
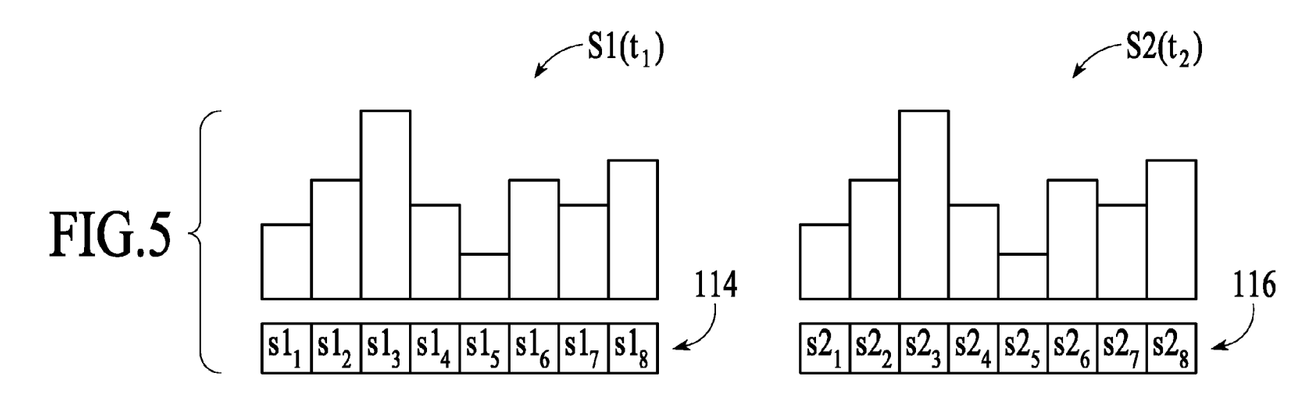
FIG. 5 illustrates two exemplary sets of pixel-specific outputs that are generated from the two photosensor arrays of FIG. 1 in the case where the photosensor arrays include eight pixels.

A more detailed description of an embodiment of the velocity determination technique is now described. At a first time, $t_1$, a first set of outputs is captured from the first photosensor array 114 (e.g., photosensor array #1). At a second time, $t_2$, that is later than the first time, a second set of outputs is captured from the second photosensor array 116 (e.g., photosensor array #2). In both cases, the sets of outputs captured by the respective photosensor arrays include a pixel-specific output from each pixel of the respective photosensor array. FIG. 4 illustrates two exemplary sets of pixel-specific outputs that are generated from the two photosensor arrays of FIG. 1 in the case where each photosensor array includes four pixels 130. As shown in FIG. 4, each pixel generates a pixel-specific output that is independent of the other pixel-specific outputs in the array. Although FIG. 4 illustrates photosensor arrays with four pixels, photosensor arrays with more or less than four pixels are possible. FIG. 5 illustrates two exemplary sets of pixel-specific outputs that are generated from the two photosensor arrays of FIG. 1 in the case where the photosensor arrays include eight pixels. Because the photosensor arrays are positioned to detect light from the same location on the surface, it is expected that a set of outputs from one photosensor array will eventually match the set of outputs from the other photosensor array because the same location on the surface comes into view of both photosensor arrays, although at different times.

The number of pixels 130 in the photosensor arrays 114, 116 can impact the accuracy of the velocity determination system 100. For example, increasing the number of pixels in each array can increase the accuracy of the matching processing, although the increased accuracy comes with a cost of additional complexity.

Once the second set of outputs is captured, it is compared to the first set of outputs to determine the difference between the two sets of outputs. In an embodiment, the difference is determined by comparing the outputs from the two photosensor arrays 114, 116 on a pixel-by-pixel basis. For example, the difference is determined according to the following equation:

$$\Delta S = (\Delta S_1 + \Delta S_2 + \Delta S_3 + \ldots + \Delta S_n)/n \qquad \text{Eq. (1)}$$

where;
$\Delta S_1 = s1_1 - s2_1$;
$\Delta S_2 = s1_2 - s2_2$;
$\Delta S_3 = s1_3 - s2_3$;
$\Delta S_n = s1_n - s2_n$;
n = the total number of pixels in each photosensor array;
$s1_x$ = the signal from photosensor array #1, pixel x; and
$s2_x$ = the signal from photosensor array #2, pixel x, where x is the pixel number from 1 to n pixels.

In an embodiment, the difference, $\Delta S$, is expressed as a percent difference. For example, the difference is expressed in percentage terms as:

$$\Delta S_x = [(s1_x - s2_x)/s1_x]*100; \qquad \text{Eq. (2) and}$$

the cumulative percent difference between the outputs of the two different photosensors is expressed as:

$$\Delta S = (\Delta S_1 \Delta S_2 + \Delta S_3 + \ldots + \Delta S_n)/n. \qquad \text{Eq. (3)}$$

Once the difference is determined, the difference is compared to a pre-established difference threshold (DT). The difference threshold is a value that is used to indicate whether there is a satisfactory match between the two sets of outputs. In an ideal case, a difference threshold of zero would indicate an exact match between the two sets of outputs. However, the photosensor arrays 114, 116 are not expected to perform ideally and setting a difference threshold to zero would be impractical in most implementations. Therefore, the difference threshold is set to a non-zero application-specific value that provides a strong indication that the same location on the surface 102 has been imaged by both of the two photosensor arrays. In an embodiment, the difference threshold can be set as a percentage difference between the two outputs. For example, a difference threshold of 2 percent could be established such that a satisfactory match is found if the percent difference is less than or equal to 2 percent and no match is found if the percent difference is greater than or equal to two percent. An exemplary difference calculation for a four pixel array is:

| Pixel 1 | |
|---|---|
| $s1_1$ (base value): | 100 |
| $s2_1$: | 99 |
| $\Delta S_1 = [|(s1_1 - s2_1)|/s1_1] * 100$: | 1 |
| Pixel 2 | |
| $s1_2$ (base value): | 105 |
| $s2_2$: | 103 |
| $\Delta S_2 = [|(s1_2 - s2_2)|/s1_2] * 100$: | 1.9048 |

-continued

Pixel 3

| | |
|---|---|
| $s1_3$ (base value): | 99 |
| $s2_3$: | 96 |
| $\Delta S_3 = [|(s1_3 - s2_3)|/s1_3] * 100$: | 3.0303 |

Pixel 4

| | |
|---|---|
| $s1_4$ (base value): | 101 |
| $s2_4$: | 102 |
| $\Delta S_4 = [|(s1_4 - s2_4)|/s1_4] * 100$: | 0.9901 |

Cumulative difference=$\Delta S=(\Delta S_1+\Delta S_2+\Delta S_3+\Delta S_4)/4=1.7313$.

If the determined difference is within the difference threshold (e.g., $\Delta S$ is less than DT), then it is assumed that the sets of outputs from the two different photosensor arrays 114, 116 are satisfactorily matched. On the contrary, if the determined difference exceeds the difference threshold, then it is assumed that the sets of outputs do not match. In the above example, since the difference of 1.7313 percent is less than the difference threshold of 2 percent, a satisfactory match is found.

Once it is determined that there is a match between two sets of outputs, then the elapsed time, T, between the capture of the set of outputs from the first photosensor array 114 and the capture of the set of outputs from the second photosensor array 116, is identified. With the elapsed time, T, and the separation distance, d, both known, the relative velocity between the surface and the velocity determination system is calculated as v=d/T.

The accuracy of the velocity determination system is a function of the magnitude of the difference threshold. The particular optimal difference threshold is dependent on the application. In an embodiment, increasing the difference threshold too far can cause the accuracy of the velocity determination system to be reduced. Likewise, if the difference threshold is too low, it becomes less likely that a satisfactory match will be found and therefore no velocity determination can be made. In an embodiment, the processing unit includes a programmable register and a programming interface for setting the difference threshold. Including a programmable register to set the difference threshold enables the velocity determination system to be configured to accommodate surfaces with imageable features of different quality.

Figure 6:
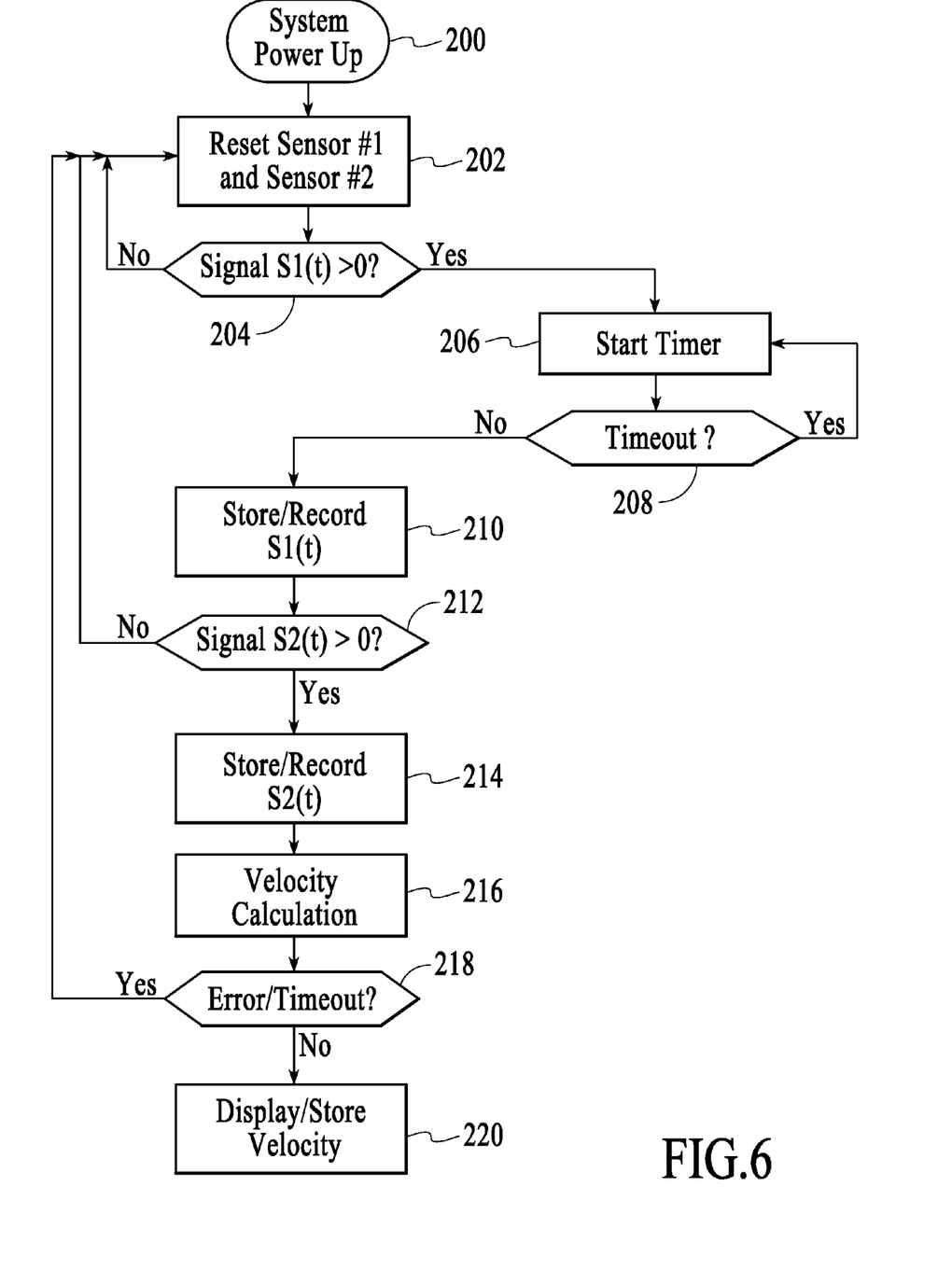
FIG. 6 is a process flow diagram of a method for relative velocity determination.

In operation, the capture of the sets of outputs from the photosensor arrays and the processing of the captured outputs is controlled to effectively determine the relative velocity between the surface and the velocity determination system. An exemplary process flow diagram of a technique for relative velocity determination is described with reference to FIGS. 6 and 7. Referring to FIG. 6, after system power up, block 200, the photosensor arrays (e.g., photosensor arrays #1 and #2) are reset, block 202. For example, resetting the photosensor arrays involves charging or discharging each pixel to a certain known voltage level. At decision point 204, it is determined whether the output from photosensor array #1 at time $t_1$, $S1(t_1)$, is greater than zero. If the output is not greater than zero, then the process returns to block 202. If the output is greater than zero, then a timer is started, block 206. At decision point 208, it is determined if a timeout has occurred. In an embodiment, a timeout is introduced to check for errors. The length of the timeout interval is dependent on the application. If a timeout occurs, the process returns to block 206 and if a timeout has not occurred, then the output, $S1(t_1)$, is stored and/or recorded, block 210. At decision point 212, it is determined whether the output from photosensor array #2 at time $t_2$, $S2(t_2)$, is greater than zero. If the output is not greater than zero, then the process returns to block 202. If the output is greater than zero, then the output, $S2(t_2)$, is stored and/or recorded, block 214. At block 216, the relative velocity is determined using the outputs $S1(t_1)$ and $S2(t_2)$ and the known separation distance, d. A more detailed description of the operations associated with block 216 is provided with reference to FIG. 7. Once the relative velocity is determined, at decision point 218 it is determined if there is an error or a timeout. If there is an error or a timeout, the process returns to block 202. If there is no error or timeout, then the determined relative velocity is displayed, stored, and/or used in some other manner, block 220.

Figure 7:
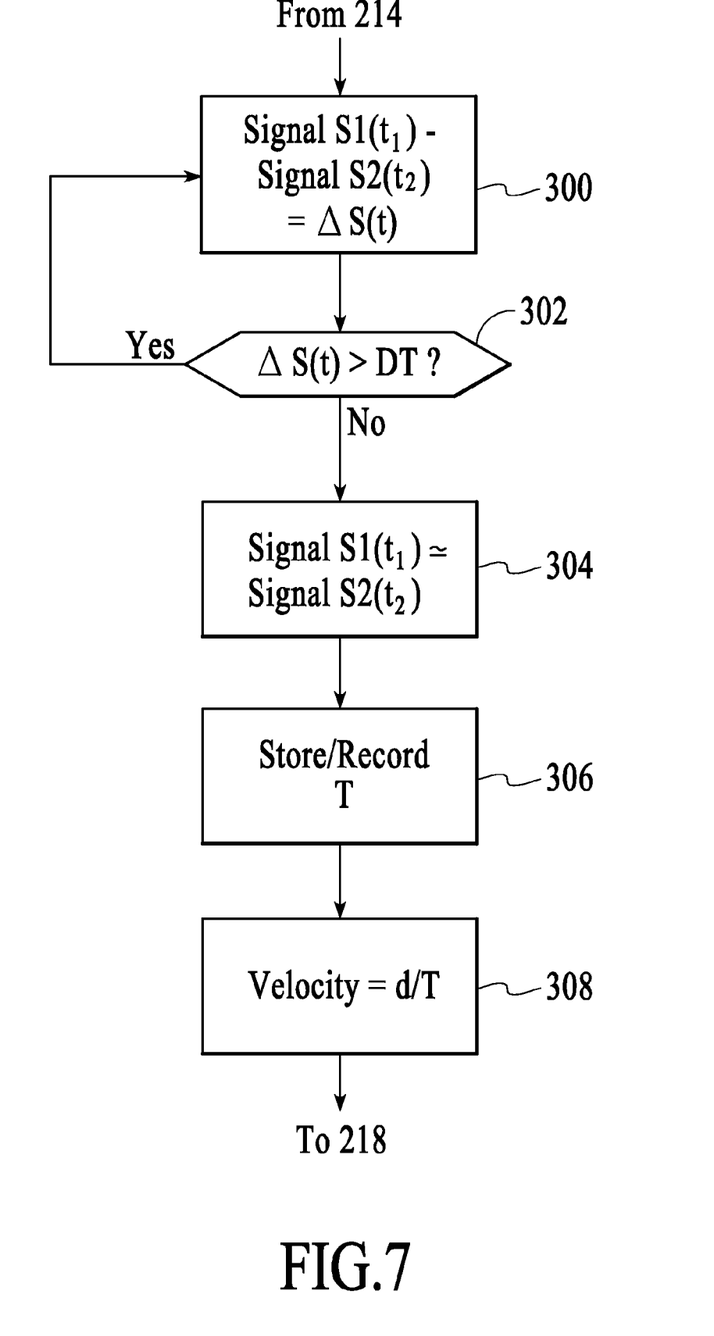
FIG. 7 depicts a more detailed process flow diagram of the relative velocity calculation block from FIG. 6.

FIG. 7 depicts a more detailed process flow diagram of the relative velocity calculation that occurs once two sets of outputs are captured. At block 300, the difference between the outputs $S1(t_1)$ and $S2(t_2)$ is determined. In particular, the difference is calculated as $\Delta S(t)=S1(t_1)-S2(t_2)$, for example, using eq. (1). At decision point 302, the difference is compared to a pre-established difference threshold, DT. If the difference, $\Delta S(t)$, is greater than the difference threshold, DT, then there is not a satisfactory match and the process returns to block X to wait for new sets of outputs. If the difference, $\Delta S(t)$, is not greater than the difference threshold, DT, then there is a satisfactory match, block 304. At block 306, the elapsed time, T, between the capture of the two sets of outputs is identified and stored and/or recorded. In this example, the elapsed time, T, is expressed as $T=t_2-t_1$. At block 308, the relative velocity is calculated as v=d/T, where d is the separation distance.

Figure 8:
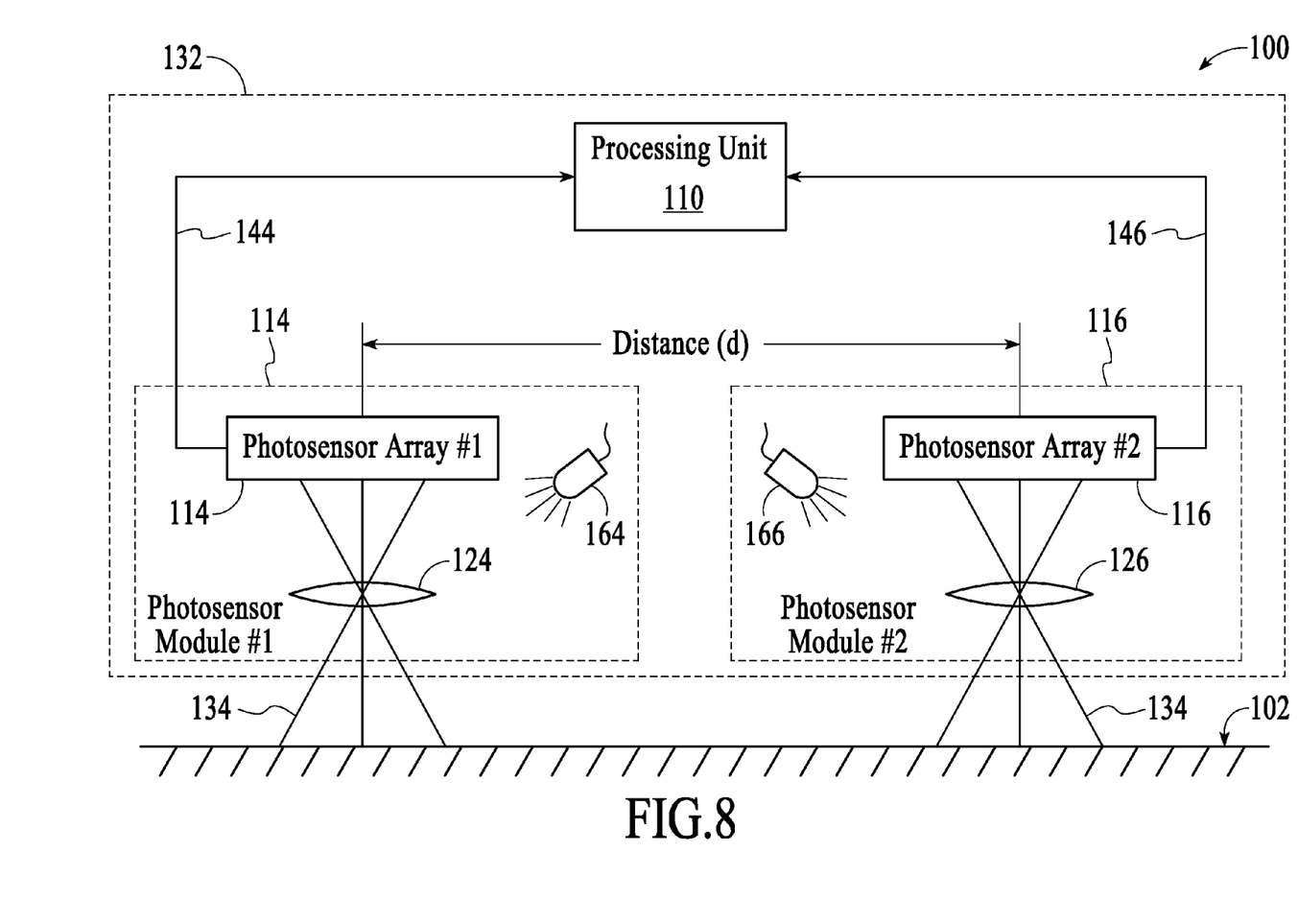
FIG. 8 depicts an embodiment of the velocity determination system from FIG. 1 in which each photosensor module includes an illumination source.

In an embodiment, each photosensor module includes an illumination source configured to illuminate a spot on the surface. For example, the illumination sources are positioned so that a large portion of the reflected light is directed towards the corresponding photosensor array. FIG. 8 depicts an embodiment of the velocity detection system 100 from FIG. 1 in which each photosensor module 104, 106 includes an illumination source 164, 166. In an alternative embodiment, a single illumination source may be used to illuminate the surface to provide reflected light for both of the two photosensor arrays.

FIG. 9 depicts a process flow diagram of a method for determining the relative velocity between a surface and a velocity determination system. At block 400, at a first time, a set of outputs is captured from a first photosensor array, wherein the first photosensor array comprises an array of pixels, with each pixel generating a pixel-specific output in response to light reflected from the surface, the pixel-specific outputs being representative of the intensity of the reflected light. At block 402, at a second time that is later than the first time, a set of outputs is captured from a second photosensor array, wherein the second photosensor array comprises an array of pixels, with each pixel generating a pixel-specific output in response to light reflected from the surface, the pixel-specific outputs being representative of the intensity of the reflected light, wherein the first and second photosensor arrays are separated by a known separation distance. At block 404, the difference between the set of outputs from the first photosensor array and the set of outputs from the second photosensor array is determined. At block 406, the difference between the set of outputs from the first photosensor array and the set of outputs from the second photosensor array are compared to a pre-established difference threshold. At block 408, the elapsed time between the capture of the set of outputs from the first photosensor array and the capture of the set of outputs from the second photosensor array is identified when the comparison of the difference between the sets indicates that the difference is within the pre-established difference threshold. At block 410, the relative velocity between the surface and the velocity detection system is calculated using the elapsed time and the known separation distance.

Although one technique for determining if a satisfactory match exists between two sets of outputs, other techniques for determining if a satisfactory match exists between two sets of outputs can be used without deviating from the scope of the invention. For example, one technique for comparing the outputs from the two photosensor arrays may involve a convolution. In an embodiment, the outputs from the two photosensor arrays are defined as functions f and g, respectively, and if f*g=1, then the two outputs are considered a match. Another technique involves finding the average value for the output from each photosensor array and then comparing the two average values. This technique can be expressed, for example, as:

$$S1_{ave} = (s1_1 + s1_2 + s1_3 + \ldots + s1_n)/n;$$

$$S2_{ave} = (s2_1 + s2_2 + s2_3 + \ldots + s2_n)/n;$$

where:
$S1_{ave}$=the average signal from photosensor #1;
$S2_{ave}$=the average signal from photosensor #2; and
n=the number of pixels in each photosensor.

such that a match is found if $S1_{ave} = S2_{ave}$.

In an embodiment, the two photosensor arrays 114 and 116 are identified sub-arrays of pixels within a large pixel array. That is, a large pixel array is fabricated on a single substrate and the two photosensor arrays 114 and 116 are two separate sub-arrays within the large pixel array. Although the two separate sub-arrays are within the same large pixel array, they are functionally identified as two separate photosensor arrays. Using this configuration, the velocity determination proceeds as described above.

Although specific embodiments of the invention have been described and illustrated, the invention is not to be limited to the specific forms or arrangements of parts as described and illustrated herein. The invention is limited only by the claims.

What is claimed is:

1. A method for determining relative velocity between a surface and a velocity detection system, the method comprising:
    at a first time, capturing a set of outputs from a first photosensor array of the velocity detection system, wherein the first photosensor array comprises an array of pixels, with each pixel generating a pixel-specific output in response to light reflected from the surface, the pixel-specific outputs being representative of the intensity of the reflected light;
    at a second time that is later than the first time, capturing a set of outputs from a second photosensor array of the velocity detection system, wherein the second photosensor array comprises an array of pixels, with each pixel generating a pixel-specific output in response to light reflected from the surface, the pixel-specific outputs being representative of the intensity of the reflected light, wherein the first and second photosensor arrays are separated by a known separation distance;
    determining the difference between the set of outputs from the first photosensor array and the set of outputs from the second photosensor array;
    comparing the difference between the set of outputs from the first photosensor array and the set of outputs from the second photosensor array to a pre-established difference threshold;
    identifying the elapsed time between the capture of the set of outputs from the first photosensor array and the capture of the set of outputs from the second photosensor array when the comparison of the difference between the sets indicates that the difference is within the pre-established difference threshold; and
    calculating the relative velocity between the surface and the velocity detection system using the elapsed time and the known separation distance.

2. The method of claim 1 wherein determining the difference between the set of outputs comprises determining the difference of the pixel-specific outputs on a pixel-by-pixel basis between the first and second photosensor arrays.

3. The method of claim 2 wherein the first and second photosensor arrays have corresponding pixels.

4. The method of claim 3 wherein the differences of the pixel-specific outputs are determined for corresponding pixels.

5. The method of claim 2 wherein the first and second photosensor arrays are identical to each other.

6. The method of claim 2 wherein the first and second photosensor arrays have the same number of pixels in the same arrangement.

7. The method of claim 1 wherein comparing the difference between the set of outputs from the first photosensor array and the set of outputs from the second photosensor array to a pre-established difference threshold comprises comparing the difference between outputs from the first photosensor array and outputs from the second photosensor array to a pre-established difference threshold on a pixel-by-pixel basis.

8. The method of claim 1 further comprising adjusting the pre-established difference threshold.

9. A velocity determination system for determining relative velocity between a surface and the velocity detection system, the velocity determination system comprising:
    a first photosensor array comprising an array of pixels, wherein each pixel is configured to generate a pixel-specific output in response to light reflected from the surface, the pixel-specific outputs being representative of the intensity of the reflected light;
    a second photosensor array comprising an array of pixels, wherein each pixel is configured to generate a pixel-specific output in response to light reflected from the surface, the pixel-specific outputs being representative of the intensity of the reflected light;
    wherein the first and second photosensor arrays are separated by a known separation distance; and
    a processing unit configured to:
        determine the difference between a set of outputs captured from the first photosensor array at a first time and a set of outputs captured from the second photosensor array at a second time that is later than the first time;
        compare the difference between the set of outputs from the first photosensor array and the set of outputs from the second photosensor array to a pre-established difference threshold;
        identify the elapsed time between the capture of the set of outputs from the first photosensor array and the capture of the set of outputs from the second photosensor array when the comparison of the difference between the sets indicates that the difference is within the pre-established difference threshold; and
        calculate the relative velocity between the surface and the velocity detection system using the elapsed time and the known separation distance.

10. The velocity determination system of claim 9 wherein the processing unit is configured such that determining the difference comprises determining the difference of the pixel-specific outputs on a pixel-by-pixel basis between the first and second photosensor arrays.

11. The velocity determination system of claim 10 wherein the first and second photosensor arrays have corresponding pixels.

12. The velocity determination system of claim 11 wherein the differences of the pixel-specific outputs are determined for corresponding pixels.

13. The velocity determination system of claim 10 wherein the first and second photosensor arrays are identical to each other.

14. The velocity determination system of claim 10 wherein the first and second photosensor arrays have the same number of pixels in the same arrangement.

15. The velocity determination system of claim 9 wherein comparing the difference between the set of outputs from the first photosensor array and the set of outputs from the second photosensor array to a pre-established difference threshold comprises comparing the difference between outputs from the first photosensor array and outputs from the second photosensor array to a pre-established difference threshold on a pixel-by-pixel basis.

16. The velocity determination system of claim 9 wherein the first and second photosensor arrays are one-dimensional arrays.

17. The velocity determination system of claim 9 wherein the first and second photosensor arrays are two-dimensional arrays.

18. The velocity determination system of claim 9 wherein the processing unit comprises means for adjusting the pre-established difference threshold.

19. The velocity determination system of claim 9 further comprising parallel connections between each pixel of the photosensor arrays and the processing unit.

20. A method for determining relative velocity between a surface and a velocity detection system, the method comprising:
   at a first time, capturing a set of outputs from a first photosensor array of the velocity detection system, wherein the first photosensor array comprises an array of pixels, with each pixel generating a pixel-specific output in response to light reflected from the surface, the pixel-specific outputs being representative of the intensity of the reflected light;
   at a second time that is later than the first time, capturing a set of outputs from a second photosensor array of the velocity detection system, wherein the second photosensor array comprises an array of pixels, with each pixel generating a pixel-specific output in response to light reflected from the surface, the pixel-specific outputs being representative of the intensity of the reflected light, wherein the first and second photosensor arrays are separated by a known separation distance;
   determining if there is a satisfactory match between the set of outputs from the first photosensor array and the set of outputs from the second photosensor array;
   identifying the elapsed time between the capture of the set of outputs from the first photosensor array and the capture of the set of outputs from the second photosensor array when a satisfactory match is determined; and
   calculating the relative velocity between the surface and the velocity detection system using the elapsed time and the known separation distance.

* * * * *